(12) United States Patent
Lattanzi

(10) Patent No.: US 11,602,818 B2
(45) Date of Patent: Mar. 14, 2023

(54) WORK CENTRE TO PROCESS SECTION BARS, IN PARTICULAR MADE OF ALUMINIUM, LIGHT ALLOYS, PVC OR THE LIKE

(71) Applicant: F.O.M. INDUSTRIE S.R.L., Cattolica (IT)

(72) Inventor: Lorenzo Lattanzi, Pesaro (IT)

(73) Assignee: F.O.M. INDUSTRIE S.R.L.

(*) Notice: Subject to any disclaimer, the term of this patent is extended or adjusted under 35 U.S.C. 154(b) by 0 days.

(21) Appl. No.: 17/420,904

(22) PCT Filed: Jan. 8, 2020

(86) PCT No.: PCT/IB2020/050122
§ 371 (c)(1),
(2) Date: Jul. 6, 2021

(87) PCT Pub. No.: WO2020/144597
PCT Pub. Date: Jul. 16, 2020

(65) Prior Publication Data
US 2022/0063044 A1    Mar. 3, 2022

(30) Foreign Application Priority Data
Jan. 8, 2019 (IT) .................. 102019000000178

(51) Int. Cl.
*B23Q 17/22* (2006.01)
*B23Q 3/06* (2006.01)

(52) U.S. Cl.
CPC ......... *B23Q 17/2291* (2013.01); *B23Q 3/064* (2013.01); *B23Q 2240/007* (2013.01)

(58) Field of Classification Search
CPC ............... B23Q 17/2291; B23Q 3/064; B23Q 2240/007; B27M 1/08
See application file for complete search history.

(56) References Cited

U.S. PATENT DOCUMENTS

2007/0267104 A1* 11/2007 McGehee ............... B27M 1/08
144/373

FOREIGN PATENT DOCUMENTS

| DE | 102008051116 | | 4/2009 | | |
| DE | 102008051116 | A1 * | 4/2009 | ............ | B23Q 1/037 |
| DE | 202010012085 | U1 | 11/2010 | | |
| DE | 202010012085 | U1 * | 12/2010 | ............ | B23Q 1/012 |
| EP | 2845702 | A1 * | 3/2015 | ............ | B27G 21/00 |

(Continued)

OTHER PUBLICATIONS

Paolo Bernardi; Wooden component processing machine; Apr. 23, 2009; pp. 1-4 (Year: 2022).*

*Primary Examiner* — Bayan Salone
(74) *Attorney, Agent, or Firm* — The Belles Group, P.C.

(57) ABSTRACT

A work centre to process section bars, in particular made of aluminium, light alloys, PVC or the like, is provided with a plurality of gripping units movable along a base and designed to hold at least one section bar, an overhead crane movable along the base and provided with at least one operating head to cut and/or process sections bars, a signalling unit provided with a plurality of light devices distributed along the base, and an electronic control unit configured to selectively turn on the light devices and signal to the operators in charge the position of each section bar to be loaded in the relevant gripping units.

17 Claims, 4 Drawing Sheets

(56) References Cited

FOREIGN PATENT DOCUMENTS

| EP | 2845702 | A1 | | 3/2015 | |
|----|---------|----|---|--------|---|
| EP | 3219426 | A1 | * | 9/2017 | ........... B23D 59/001 |
| EP | 3219426 | A1 | | 9/2017 | |

* cited by examiner

WORK CENTRE TO PROCESS SECTION BARS, IN PARTICULAR MADE OF ALUMINIUM, LIGHT ALLOYS, PVC OR THE LIKE

CROSS-REFERENCE TO RELATED APPLICATIONS

This patent application is a U.S. national stage application under 35 U.S.C. § 371 of PCT Application No. PCT/IB2020/050122, filed Jan. 8, 2020, which claims priority from Italian patent application no. 102019000000178 filed Jan. 8, 2019, the entire disclosure of the aforementioned priority applications are incorporated herein by reference in their entireties.

TECHNICAL FIELD

The present invention relates to a work centre to process section bars, in particular made of aluminium, light alloys, PVC or the like.

BACKGROUND ART

In the section bar processing field, it is known to provide a work centre of the type comprising an elongated base extending in a substantially horizontal first direction; a plurality of crosspieces, each of which is mounted on the base parallel to a second direction substantially horizontal and transverse to the first direction, is movable along the base in the first direction, and supports a gripping unit designed to hold at least one section bar; and an overhead crane, which extends above the base in the second direction, is movable along the base in the first direction and supports at least one operating head to cut and/or process the section bars.

Generally, each section bar is loaded in the relative gripping units with its own free end in contact with a positioning plate movable, under the thrust of an actuating device, between an operating position, in which the positioning plate is arranged so as to allow a correct positioning of the section bar in the first direction, and a rest position, in which the positioning plate is arranged so as not to interfere with the operating head.

Known work centres of the type described above have some drawbacks mainly deriving from the fact that the positioning of each section bar in the relative gripping units requires the presence of a positioning plate and of the relative actuating device. Consequently, the work centre is relatively complex, cumbersome and expensive. It must be designed to house the positioning plates and the relative actuating devices in the base, and allows a relatively small number of section bars to be simultaneously loaded in the gripping units.

DISCLOSURE OF INVENTION

The object of the present invention is to provide a work centre to process section bars, in particular made of aluminium, light alloys, PVC or the like, which is free from the drawbacks described above and which is simple and inexpensive to implement.

According to the present invention, it is provided a work centre to process section bars, in particular made of aluminium, light alloys, PVC or the like, as claimed in claims 1 to 9.

The present invention further relates to a method to position at least one section bar in a work centre to process section bars, in particular made of aluminium, light alloys, PVC or the like.

According to the present invention, it is provided a method to position at least one section bar in a work centre to process section bars, in particular made of aluminium, light alloys, PVC or the like, as claimed in claims 10 to 17.

BRIEF DESCRIPTION OF THE DRAWINGS

The present invention will now be described with reference to the attached drawings showing a non-limiting example of embodiment, in which.

BEST MODE FOR CARRYING OUT THE INVENTION

Figure 1:
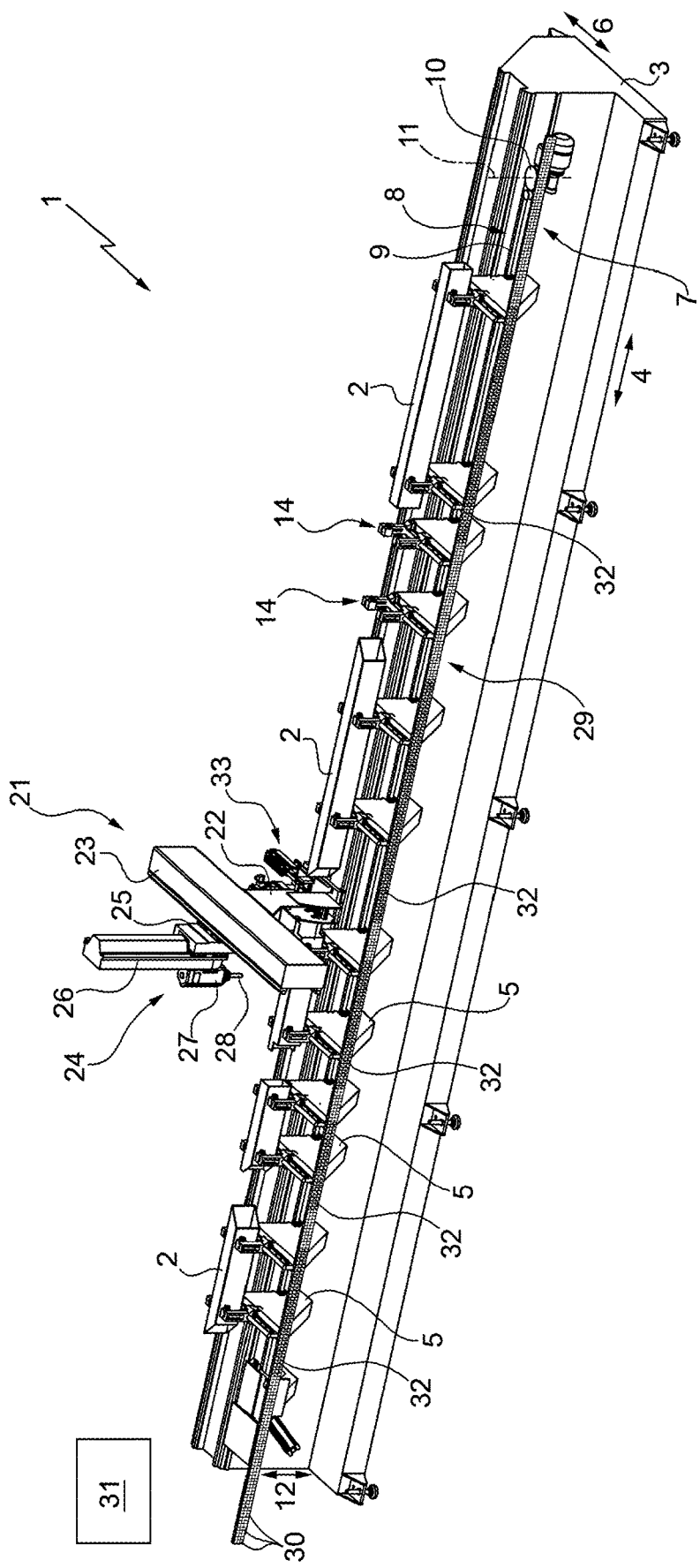
FIG. 1 is a schematic perspective view, with parts removed for clarity's sake, of a preferred embodiment of the work centre of the present invention.
Figure 2:
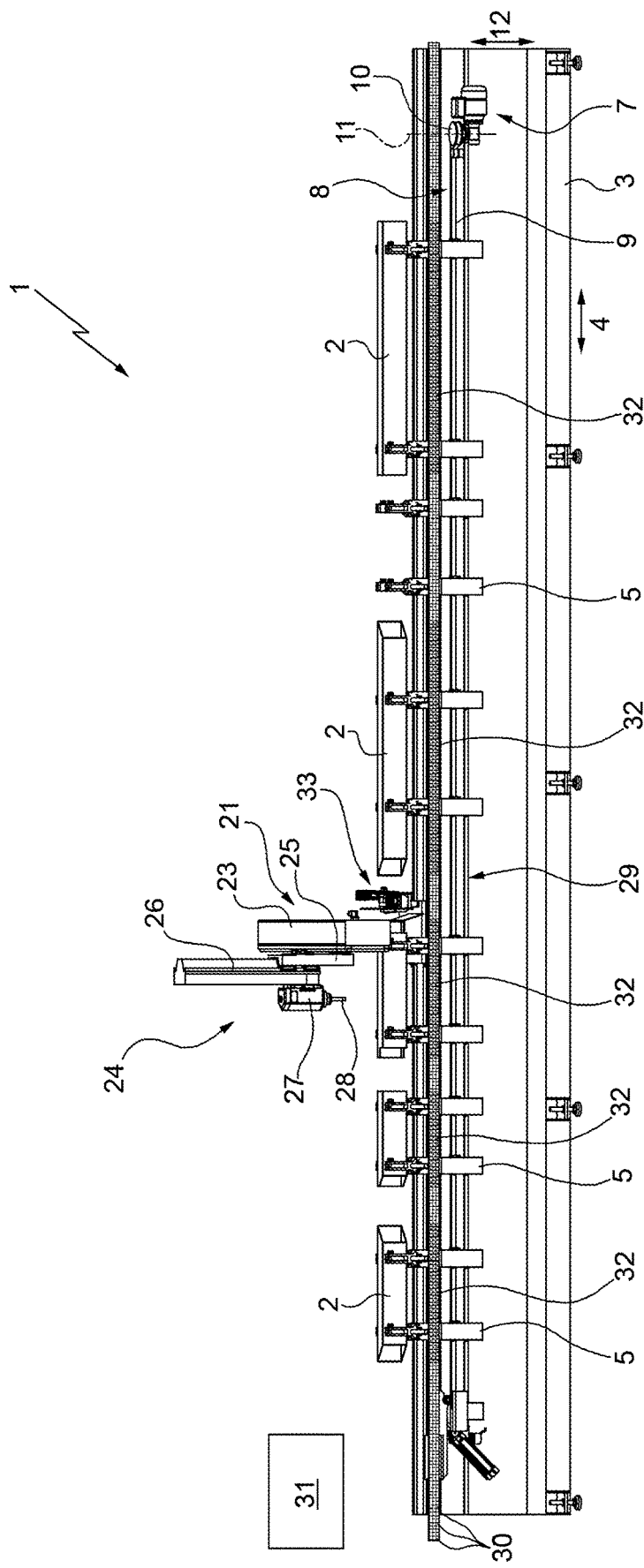
FIG. 2 is a schematic side view, with parts removed for clarity's sake, of the work centre of FIG. 1.

With reference to FIGS. 1 and 2, 1 indicates, as a whole, a work centre to process elongated section bars 2, in particular made of aluminium, light alloys, PVC or the like.

The work centre 1 comprises an elongated base 3, which extends in a horizontal direction 4 and supports a plurality of crosspieces 5, which in turn extend in a horizontal direction 6 transverse to the direction 4 and are slidably coupled to the base 3 to be moved by an actuating device 7 along the base 3 in the direction 4.

The device 7 comprises a belt conveyor 8, which extends in the direction 4 and comprises a belt 9 wound in a ring about a pair of return pulleys 10 (only one of which is shown in FIG. 1) mounted to rotate about respective rotation axes 11 parallel to each other and to a vertical direction 12 orthogonal to the directions 4 and 6.

Each crosspiece 5 is provided with a hooking device (not shown), movable between a hooking position of the crosspiece 5 to the belt 9 and a release position and with a locking device (not shown), movable between a locking position of the crosspiece 5 on the base 3 and a release position.

Figure 3:
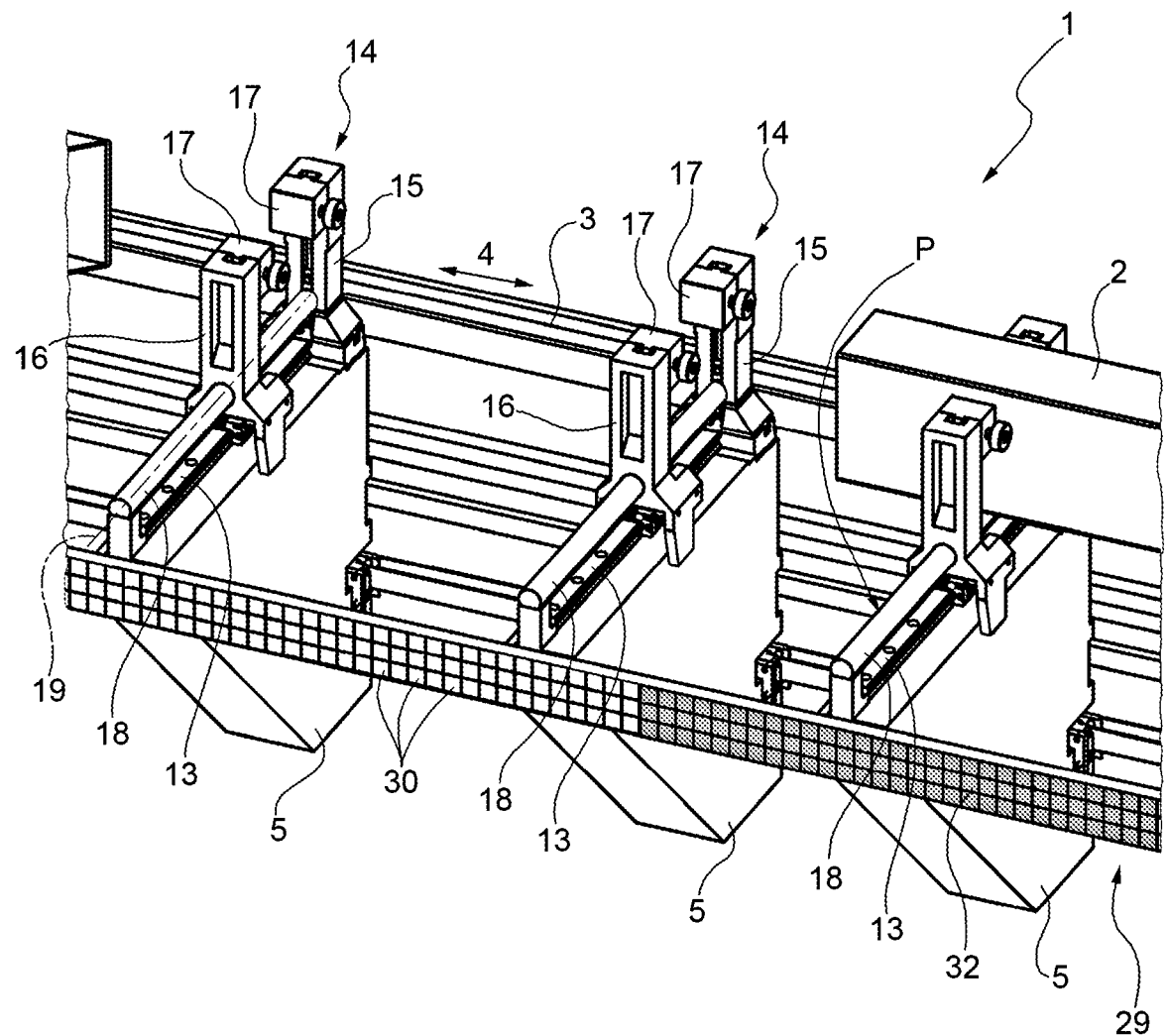
FIG. 3 is a schematic perspective view, on an enlarged scale and with parts removed for clarity's sake, of a first detail of the work centre of FIGS. 1 and 2.

As shown in FIG. 3, each crosspiece 5 is provided with a straight guide 13 fixed on an upper face of the crosspiece 5 parallel to the direction 6, and supports a clamping vice 14 comprising two gripping jaws 15, 16.

The jaws 15, 16 extend upwards from the crosspiece 5 in the direction 12, and are each provided with a respective pad 17 made of elastically deformable material facing the pad 17 of the other jaw 15, 16.

In this case, the jaw 15 is fixed to a free end of the guide 13 and the jaw 16 is slidably coupled to the guide 13 to make rectilinear movements in the direction 6 between a clamping position and a release position of a section bar 2.

Each vice 14 further comprises a support roller 18, which is mounted to rotate about a rotation axis 19 parallel to the direction 6, defines together with the rollers 18 of the other vices 14 a support plane P for a section bar 2 and is slidably engaged by the jaw 16.

The work centre 1 further has an overhead crane 21 comprising, in this case, a vertical upright 22, which is coupled in a known way to the base 3 to make rectilinear movements along the base 3 in the direction 4, and has a crosspiece 23 extending above the base 3 in the direction 6 and connected to its own free end.

The crosspiece 23 supports at least one operating head 24 comprising a horizontal slide 25 coupled in a known way to the crosspiece 23 to make rectilinear movements along the crosspiece 23 in the direction 6, and a vertical slide 26 coupled in a known way to the horizontal slide 25 to make rectilinear movements in the direction 12.

The head 24 further comprises an electrospindle 27, which is coupled in a known way to the vertical slide 26 according to the processing operations to be carried out on the section bars 2 and has an interchangeable milling tool 28 engaged thereon.

In other words, the electrospindle 27 is mounted on the slide 16 to rotate e.g. about a rotation axis (not shown) parallel to the direction 4 and/or about a rotation axis (not shown) parallel to the direction 12 and is configured to receive and hold tools to cut and/or process section bars 2.

With reference to FIGS. 1 and 2, the work centre 1 is equipped with a signalling unit 29 to signal the position of each section bar 2 to be loaded in the clamps 14 to the operators in charge.

The unit 29 comprises a plurality of light devices 30, in this case LED lights, which are distributed along the base 3 in the direction 4, in particular mounted on the base 3, and are connected with an electronic control unit 31 of the work centre 1.

The control unit 31 is configured to selectively turn on the devices 30 according to the position of the section bars 2 to be loaded in the clamps 14. In this case, the control unit 31 is configured to turn on a number of devices 30 corresponding to the length of each section bar 2 to be loaded in the clamps 14 measured parallel to the direction 4.

In other words, the devices 30 are turned on selectively so as to define, for each section bar 2 to be loaded in the clamps 14, a respective light area 32 designed to signal to the operators in charge the position of the section bar 2 in the direction 4.

The position, in the direction 4, of each section bar 2 loaded in the relative clamps 14 is controlled by a detection device 33 connected to the control unit 31 and mounted, in this case, on the overhead crane 21 to move along the base 3 in the direction 4 integrally with the overhead crane 21.

According to a variant not shown, the device 33 is slidably coupled to the base 3 to move along the base 3 in the direction 4 independently of the overhead crane 21.

Figure 4:
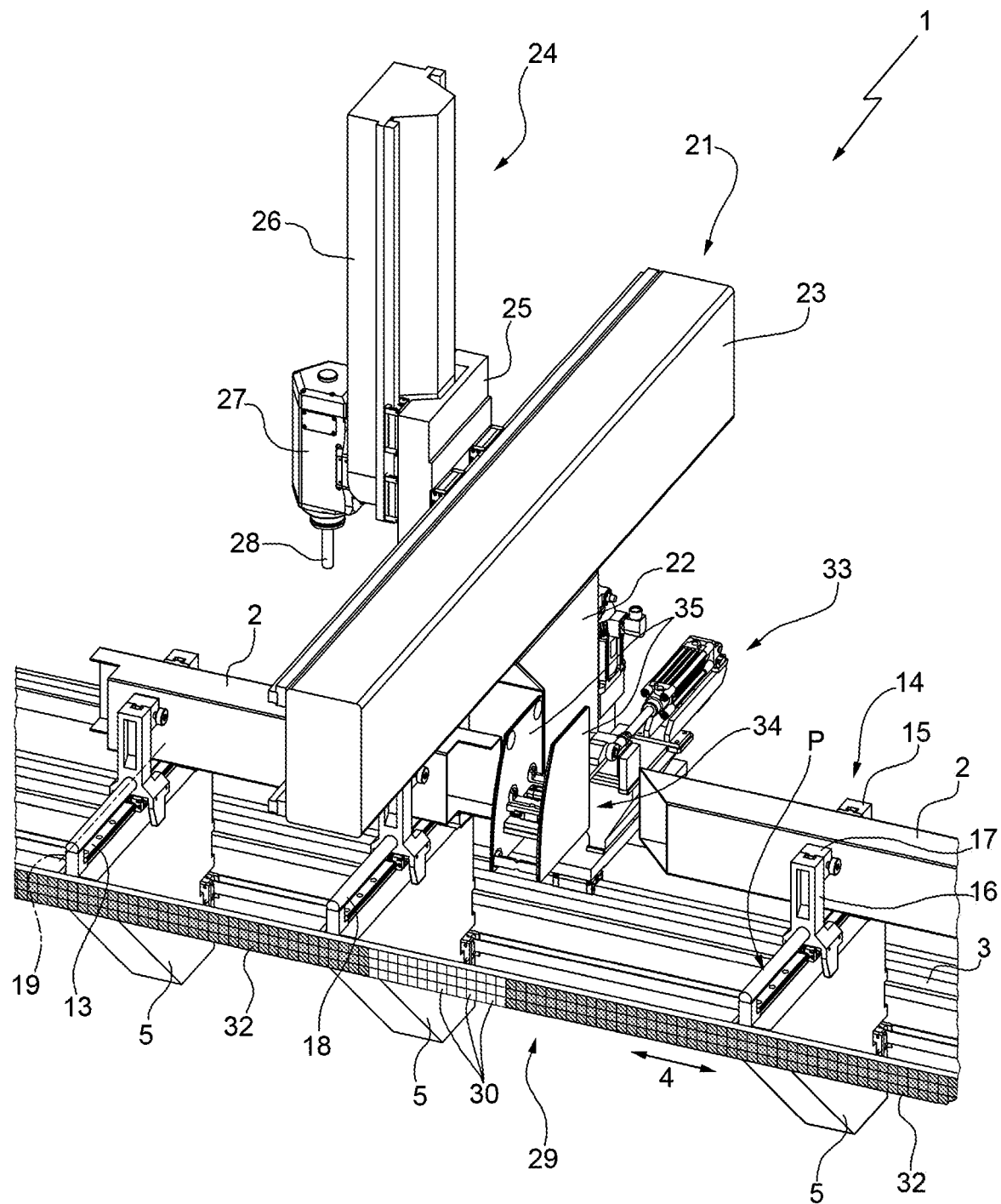
FIG. 4 is a schematic perspective view, on an enlarged scale and with parts removed for clarity's sake, of a second detail of the work centre of FIGS. 1 and 2.

As shown in FIG. 4, the device 33 comprises, in this case, a fork-shaped element 34 provided with a pair of arms defined by respective support plates 35 parallel to each other and perpendicular to the direction 4.

The element 34 is movable between an operating position (FIG. 4), in which the plates 35 protrude above the base in the direction 6 to come into contact with the free ends of the section bars 2, and a rest position (not shown), in which the plates 35 do not interfere with the section bars 2.

According to a variant not shown, the detection device 33 is removed and replaced with an optical-type detection device.

In use, at each operating cycle of the work centre 1, the crosspieces 5 and, therefore, the clamps 14 are positioned along the base 3 in the direction 4 by the actuating device 7 and the light devices 30 are selectively turned on by the control unit 31 to light up the light areas 32 and allow the operators in charge to load the section bars 2 in the clamps 14 in a relatively easy and precise way.

Subsequently, the element 34 is moved between its operating position and its rest position to allow the plates 35 to come into contact with at least one free end of each section bar 2, preferably each free end of each section bar 2, and to allow the control unit 31 to store the real position of each section bar 2 in the direction 4 and to calculate the length of each section bar 2 in the direction 4.

The work centre 1 has some advantages mainly deriving from the fact that the signalling unit 29 allows the operators in charge to position a relatively large number of section bars 2 in the clamps 14 in a relatively simple and inexpensive way and from the fact that the detection device 33 allows the electronic control unit 31 to store the real position of each section bar 2 in the direction 4, regardless of any positioning mistakes made by operators in charge.

According to some variants not shown, the control unit 31 is configured so as to:
turning on, for each section bar 2 to be loaded in the clamps 14, the two devices 30 corresponding to the ends of the section bar 2 and allowing the operators in charge to position the section bar 2 between the two activated devices 30;
turning on, for each section bar 2 to be loaded in the clamps 14, the device 30 corresponding to one end of the section bar 2 and allowing the operators in charge to position the section bar 2 starting from the activated device 30;
turning off the devices 30 of the area 32 corresponding to the section bar 2 to be loaded in the clamps 14, turning on the devices 30 out of the area 32, and allowing the operators in charge to position the section bar 2 between the activated devices 30.

The invention claimed is:

1. A work center to process section bars, in particular made of aluminum, light alloys, PVC or the like, comprising an elongated base extending in a first direction; a plurality of crosspieces, each movable along the base in the first direction and supporting at least one gripping unit designed to hold at least one section bar; and an operating head to cut and/or process the section bars, which is movable along the base in the first direction and above the base in a second direction, which is transverse to the first direction; and characterized in that it further comprises a signaling unit provided with a plurality of light devices distributed along the base in the first direction, and an electroniccontrol unit configured to selectively turn on the light devices and to signal to operators in charge the position of each section bar to be loaded in the relative gripping units.

2. A work centre according to claim 1, wherein, for each section bar to be loaded in the relative gripping units, the electronic control unit is configured to turn on a number of light devices corresponding to a length of the section bar measured parallel to the first direction.

3. A work centre according to claim 1, wherein, for each section bar to be loaded in the relative gripping units, the electronic control unit is configured to turn on the two light devices corresponding to the positions of the ends of the section bar.

4. A work centre according to claim 1, wherein, for each section bar (2) to be loaded in the relative gripping units, the electronic control unit is configured to turn on the light device corresponding to the position of one of the ends of the section bar.

5. A work centre according to claim 1, wherein for each section bar to be loaded in the relative gripping units, the electronic control unit is configured to turn on the light devices external with respect to the position of the section bar.

6. A work centre according to claim 1 and further comprising a detection device to detect the position of the section bars loaded in the relative gripping units.

7. A work centre according to claim 6, wherein the detection device is movable along the base in the first direction to detect the position of at least one free end, preferably of each free end, of each section bar loaded in the relative gripping units.

8. A work centre according to claim 7, wherein the electronic control unit is connected to the detection device to calculate the length of each section bar loaded in the relative gripping units depending on the positions of the free ends of the section bar detected by the detection device and stored in the electronic control unit.

9. A work centre according to claim 1 and further comprising an overhead crane, which is movable along the base in the first direction and extends above the base in the second direction; the operating head being mounted on the overhead crane.

10. A method to position at least one section bar-2} in a work to process section bars, in particular made of aluminum, light alloys, PVC or the like, comprising an elongated base extending in a first direction; a plurality of crosspieces, each movable along the base in the first direction and supporting at least one gripping unit designed to hold at least one section bar; and an overhead crane, which extends above the base in a second direction transverse to the first direction, is movable along the base in the first direction and is provided with at least an operating head to cut and/or process the section bars; the method comprising the step of: positioning the crosspieces and, hence, the gripping units along the base in the first direction; and being characterized in that it further comprises the step of: signaling to operators in charge the position of each section bar—to be loaded in the relative gripping units by means of selectively turning on a plurality of light devices distributed along the base in the first direction.

11. A method according to claim 10 and further comprising the step of:
turning on, for each section bar to be loaded in the relative gripping units, a number of light device corresponding to a length of the section bar in the first direction.

12. A method according to claim 10 and further comprising the step of: turning on, for each section bar to be loaded in the relative gripping units, the two light devices corresponding to the positions of the ends of the section bar.

13. A method according to claim 10 and further comprising the step of:
turning on, for each section bar to be loaded in the relative gripping units, the light device corresponding to the position of one of the ends of the section bar.

14. A method according to claim 10 and further comprising the step of:
turning on, for each section bar to be loaded in the relative gripping units, the light devices external with respect to the position of the section bar.

15. A method according to claim 10 and further comprising the step of:
detecting the position of each section bar loaded in the relative gripping units by means of a detection device.

16. A method according to claim 15 and further comprising the step of:
moving the detection device along the base in the first direction in order to detect the position of at least one free end, preferably of each free end, of each section bar loaded in the relative gripping units.

17. A method according to claim 16 and further comprising the step of:
calculating the length of each section bar loaded in the relative gripping units depending on the positions of the relative free ends detected by the detection device.

* * * * *